United States Patent [19]

Bowling et al.

[11] Patent Number: 5,628,821
[45] Date of Patent: May 13, 1997

[54] MODELING COMPOSITION

[76] Inventors: Patricia H. Bowling; David N. L. Bowling, both of 4741 Guerley Rd., Cincinnati, Ohio 45238

[21] Appl. No.: 606,310

[22] Filed: Feb. 23, 1996

[51] Int. Cl.$^6$ ............... C09D 103/02; C09D 189/00
[52] U.S. Cl. ............... 106/126.1; 106/132.2; 106/134.1; 106/134.2
[58] Field of Search ............... 106/126.1, 132.2, 106/134.1, 134.2

[56] References Cited

U.S. PATENT DOCUMENTS

| | | | |
|---|---|---|---|
| 198,852 | 1/1878 | Nellis | 106/126.1 |
| 2,350,953 | 6/1944 | Bain et al. | 106/134.1 |
| 2,687,966 | 8/1954 | Miner et al. | 106/132.2 |
| 3,849,356 | 11/1974 | Matsui et al. | |
| 4,386,964 | 6/1983 | Herbert | 106/132.2 |
| 5,057,155 | 10/1991 | Nakayama et al. | 106/35 |
| 5,079,201 | 1/1992 | Chu et al. | 502/68 |
| 5,133,804 | 7/1992 | Culpon, Jr. | 106/38.24 |
| 5,156,876 | 10/1992 | Clapp et al. | 426/609 |
| 5,174,581 | 12/1992 | Goodson | 273/363 |
| 5,317,119 | 5/1994 | Ayres | 219/734 |
| 5,395,437 | 3/1995 | Chiou | 106/38.2 |

FOREIGN PATENT DOCUMENTS

0017361A1  10/1980  European Pat. Off.

*Primary Examiner*—David Brunsman
*Attorney, Agent, or Firm*—Richard C. Litman

[57] ABSTRACT

A modeling composition which shapes easily, while holding shaped details sharply, is made from an earth component, flour, distilled water, shortening and/or vegetable oil, emulsifiers, preservatives, and optionally corn starch, salt, flavoring, and/or coloring. The composition can be easily smoothed out when two pieces are joined together without crease formation, is storage stable, and upon baking forms products which can be less fragile than those made from conventional clays. The compositions are substantially non-toxic, water soluble, and clean easily with soap and water.

14 Claims, No Drawings

MODELING COMPOSITION

BACKGROUND OF THE INVENTION

1. Field of the Invention

The present invention relates to modeling compositions. More particularly, the present invention relates to composite earth compositions useful as modeling mediums.

2. Description of the Prior Art

From time immemorial, the concept of shaping articles in clay has been closely associated with the creative powers of humankind. This is reflected in beliefs and legends central to almost every culture. From Prometheus to Genesis, the flow of life itself from modeled forms has been a civilizing force. With all the advances in other areas of human endeavor, the basic modeling material has remained remarkably unaltered; namely clay in a wetted form is shaped as desired, then baked. It has been difficult to supplant clay as a modeling material since it naturally performs functions difficult to recreate synthetically. Among these, the ease in which the modeling material is shaped, the ability of the modeled material to hold the shape through the baking process, and the stability of the final baked form, are the main factors in determining the adequacy of a particular modeling material to perform its basic function.

Nonetheless, modeling compositions have been the subject of earlier patents. For example, European Patent Application Publication No. 0 017 361 A1, published Oct. 15, 1980 and assigned to Verve Enterprises, discloses a modeling powder that includes grain flour, a food acid, NaCl, and an edible oil.

As opposed to modeling compositions, in which the ability to hold a shape while uncured is of paramount importance, molding compositions have seen great advances. Molding compositions are basically flowable fluids which may be solidified. These compositions require a form or other support into which the fluid is filled. Upon curing, the molding composition takes the negative shape of the form or support. Various plastics and cementitious materials are representative of these compositions. U.S. Pat. No. 5,317,119, issued May 31, 1994 to J. Ayres describes a molding composition useful for disposable food containers which comprises sand, a binder selected from starch, grain flours and mixtures thereof, salt, oil, and water. Other molding compositions are described in, for example, U.S. Pat. No. 3,849,356, issued Nov. 19, 1974 to A. Matsui et al.; U.S. Pat. No. 5,057,155, issued Oct. 15, 1991 to S. Nakayama et al; U.S. Pat. No. 5,133,804, issued Jul. 28, 1992 to D. Culpon, Jr.; and U.S. Pat. No. 5,395,437, issued Mar. 7, 1995 to W. Chiou.

Earth and/or its inorganic components has been mixed with other ingredients to form useful compositions. For example, U.S. Pat. No. 5,079,201, issued Jan. 7, 1992 to Chu et al. describes a zeolite-clay composition useful as a food supplement. U.S. Pat. No. 5,156,876, issued Oct. 20, 1992 to C. Clapp et al. describes a parting composition for cooking foodstuffs which includes a salt release agent, an edible oil, and a pulverulent material such as edible clays, silicates, and the like.

U.S. Pat. No. 5,174,581, issued Dec. 29, 1992 to D. Goodson describes a biodegradable "clay" pigeon that is molded from crystallized sugar and various animal food stuffs, such as birdseed.

None of the above inventions and patents, taken either singly or in combination, is seen to describe the instant invention as claimed.

SUMMARY OF THE INVENTION

The invention relates generally to a modeling composition. More particularly, the invention relates to a modeling composition consisting of flour, earth, distilled water, shortening and/or vegetable oil, emulsifiers, preservatives, and optionally corn starch, salt, flavoring, and/or coloring. Unlike so many conventional clays, putties or doughs, the present modeling compositions can be molded with superb sharpened detail. It can be easily smoothed out when two pieces are joined together and no crease will be seen. Though best stored in a container, the present compositions require a long time to harden if left outside a container. Desired consistency can be achieved by adding a few drops of water as needed. When the compositions are baked, they become very hard, retaining the desired shape indefinitely. The product of the present invention also can be less fragile than those made from conventional clays.

The present combination of ingredients provides a pleasant smell and aesthetic coloring. If desired, additional coloring or perfuming agents may be added. Further, unlike conventional putties and doughs, the present modeling composition does not leave an oily and/or dirty film on the user's hands. The compositions are substantially non-toxic since, with the exception of the earth component, all the other ingredients are edible. The modeling composition is substantially water soluble and cleans easily with soap and water.

Accordingly, it is a principal object of the invention to provide a modeling composition that may be used in place of clays.

It is another object of the invention to provide a modeling composition that includes a substantial earth component in combination with particular ranges of edible components.

It is a further object of the invention to provide such a composition which is advantageous in its handling, shaping, and ability to hold a shape.

Still another object of the invention is to provide a composition which is surprisingly stable upon curing.

It is an object of the invention to provide compositions which are made from inexpensive and easily accessible components, yet fully effective in producing unique products.

These and other objects of the present invention will become readily apparent upon further review of the following specification.

DETAILED DESCRIPTION OF THE PREFERRED EMBODIMENTS

The primary ingredients of the present composition are earth, flour, water, and either solid vegetable shortening or food grade oil. Also required are emulsifiers, used to keep water and oils from separating or leaching out of the composition, and preservatives, used to prevent microbial growth. Optional ingredients include cornstarch, salt, tartaric acid, fragrance, and coloring. The modeling compositions of the present invention preferably comprises flour, earth, starch, salt, potassium bitartrate, water, cooking oil, emulsifiers and/or stabilizers, and preservatives.

For the purposes of the present invention, earth is defined as substantially inorganic particulate material, and may vary from fine grains (clays), through silts, through medium grains (composed of sand, clay, with varying amounts of allophane, quartz, feldspar, zeolites, iron oxides, and silicon), to coarse grains (substantially sand). A minimal amount of organic material may be present. Preferably, organic content is at most in trace amounts, or not present at all. One of the advantages of the present invention is the flexibility allowed in the selection of the earth component. Depending on the earth material selected, varying aesthetic properties of coloration and texture may be achieved. Preferably from about 30 to about 50 percent by weight of the composition is composed of earth.

A particularly attractive earth material includes about 80% sand, up to 12% clay, and the remainder selected from one or more of allophane, quartz, feldspar, zeolites, iron oxides, and silicon. This preferred silt is further characterized by having a pH of about 8.0, lime test index of about 70, a high Ca base saturation (about 94%), and low Mg and K base saturations (about 5% and 0.6%, respectively). The particle size of the earth used is preferably less than or equal to about 1 mm. Grinding may be necessary as a preparatory measure to achieve the desired particle size, and a 1 mm mesh used to sift the desired materials.

The flour, shortening and/or oil, and water components are used in sufficient quantities to bond the composition together. Without the flour component, the composition is unsuitably crumbly and untidy. Without the shortening and/or oil component, the composition also is crumbly and leaves a residue. Excessive quantities of shortening and/or oil are to be avoided, however, since this component proportionally lengthens the drying time required in making a final product from the composition. Sterilized water is used, preferably distilled water, to reduce the likelihood of unwanted microbe introduction. Preferably from about 19 to about 30 percent by weight flour; from about 3 to about 7 percent by weight shortening and/or oil; and from about 17 to about 21 percent by weight water is used. More preferably, corn starch is also used in an amount of from about 4 to about 8 percent by weight.

Any suitable emulsifier and/or stabilizer normally used for conventional cooking purposes may be used in the present invention, preferably in amounts from about 0.3 to about 5 percent by weight. Similarly, culinary antimicrobial preservatives in an amount from 0.6 to about 2 percent by weight are preferred. Flavorants and fragrance may also be used as desired. Among these, ginger and cinnamon are preferably used in from about 0 to about 1 percent by weight.

The modeling compositions of the present invention most preferably comprise the following components by weight:

a) 20 to 25 percent grain flour;
b) 35 to 45 percent earth;
c) 2 to 10 percent corn starch;
d) 0.05 to 6 percent salt;
e) 0.1 to 1 percent potassium bitartrate;
f) 2 to 10 percent vegetable oil;
g) 0 to 2 percent distilled monoglycerides;
h) 0 to 3 percent polyoxyethylene sorbitan monostearate;
i) 0 to 1 percent food emulsifier;
j) 18 to 25 percent distilled water;
k) 0.1 to 2 percent potassium sorbate; and
l) 0 to 5 percent methyl paraben.

The composition is preferably prepared by a process comprising the following steps:

i) sifting the earth component;
ii) sterilizing the earth component;
iii) admixing a product of ii) with flour, starch, salt, cream of tartar, and ginger;
iv) sifting a product of iii) (this is an optional step);
v) sterilizing the product of iv);
vi) admixing oil and emulsifiers into the product of v) to form a dry mixture;
vii) dissolving preservatives in room temperature water to form a wet mixture;
viii) adding the dry mixture of vi) to the wet mixture of vii); and
ix) kneading the product of viii) to form a modeling composition.

It is further important to note that any product of the invention can be reconstituted simply by pulverizing the product and rewetting with water.

It is to be understood that the present invention is not limited to the sole embodiment described above, but encompasses any and all embodiments within the scope of the following claims.

We claim:

1. A modeling composition capable of being shaped to sharp detail and holding said detail independently of a mold or support, said composition comprising: an earth component; flour; water; a bonding member consisting of one of a shortening and a food grade oil; emulsifiers; and preservatives;

wherein said earth component is a substantially inorganic particulate material selected from sands, silts, and clays.

2. The modeling composition according to claim 1, further comprising at least one of a flavorant and a fragrance.

3. The modeling composition according to claim 2 wherein said flavorant is selected from ginger, cinnamon, and cream of tartar.

4. The modeling composition according to claim 1, further comprising cornstarch.

5. The modeling composition according to claim 1, wherein said earth component forms from about 30 to about 50 percent by weight of said composition.

6. The modeling composition according to claim 5, wherein said earth component consists essentially of sand, clay and one or more of allophane, quartz, feldspar, zeolite, iron oxides, and silicon.

7. The modeling composition according to claim 1, wherein said flour forms from about 19 to about 30 percent by weight of said composition.

8. The modeling composition according to claim 1, wherein said earth component has a particle size no greater than about 1 mm.

9. The modeling composition according to claim 1, wherein said water is sterilized water.

10. The modeling composition according to claim 9, wherein said sterilized water is distilled water.

11. A modeling composition comprising:

a) 20 to 25 percent by weight grain flour;
b) 35 to 45 percent by weight earth;
c) 2 to 10 percent by weight corn starch;
d) 0.05 to 6 percent by weight salt;
e) 0.1 to 1 percent by weight potassium bitartrate;
f) 2 to 10 percent by weight vegetable oil;
g) 0 to 2 percent by weight distilled monoglycerides;
h) 0 to 3 percent by weight polyoxyethylene sorbitan monostearate;
i) 0 to 1 percent by weight food emulsifier;
j) 18 to 25 percent by weight distilled water;
k) 0.1 to 2 percent by weight potassium sorbate; and
l) 0 to 5 percent by weight methyl paraben;

wherein said earth component is a substantially inorganic particulate material selected from sands, silts, and clays.

12. A process for preparing a modeling composition comprising an earth component; water; a bonding member consisting of one of a cooking oil and a shortening; emulsifiers; and preservatives; said process comprising the following steps;

i) sifting the earth component;

ii) sterilizing the earth component;

iii) admixing a product of ii) with flour;

iv) sterilizing the product of iii);

v) admixing said bonding member and said emulsifiers into the product of iv) to form a dry mixture;

vi) dissolving said preservatives in said water at room temperature to form a wet mixture;

vii) adding the dry mixture of v) to the wet mixture of vi); and viii) kneading the product of vii) to form a modeling composition.

13. The process according to claim 12, wherein said modeling composition further comprises starch, salt, cream of tartar, and ginger; said starch, salt, cream of tartar, and ginger being added to said flour in step iii).

14. The process according to claim 12, further comprising the step of sifting a product of iii).

* * * * *